(12) United States Patent
Tabanpour (10) Patent No.: US 10,934,194 B2
(45) Date of Patent: Mar. 2, 2021

(54) WASTEWATER TREATMENT WITH CUSTOMIZED PHOSPHATE CONTROL

(71) Applicant: NUTRIENT RECOVERY & UPCYCLING, LLC, Madison, WI (US)

(72) Inventor: Menachem Tabanpour, Madison, WI (US)

(73) Assignee: NUTRIENT RECOVERY & UPCYCLING, LLC, Madison, WI (US)

( * ) Notice: Subject to any disclaimer, the term of this patent is extended or adjusted under 35 U.S.C. 154(b) by 0 days.

(21) Appl. No.: 16/339,137

(22) PCT Filed: Oct. 4, 2017

(86) PCT No.: PCT/US2017/055026
§ 371 (c)(1),
(2) Date: Apr. 3, 2019

(87) PCT Pub. No.: WO2018/067631
PCT Pub. Date: Apr. 12, 2018

(65) Prior Publication Data
US 2019/0225517 A1    Jul. 25, 2019

Related U.S. Application Data

(60) Provisional application No. 62/404,326, filed on Oct. 5, 2016.

(51) Int. Cl.
*C02F 3/28* (2006.01)
*C02F 11/04* (2006.01)
(Continued)

(52) U.S. Cl.
CPC ............ *C02F 3/286* (2013.01); *B01D 61/422* (2013.01); *B01D 61/46* (2013.01); *C01B 25/28* (2013.01);
(Continued)

(58) Field of Classification Search
CPC .. C02F 3/286; C02F 9/00; C02F 11/12; C02F 11/006; C02F 11/18; C02F 11/04;
(Continued)

(56) References Cited

U.S. PATENT DOCUMENTS 6,966,989 B2 * 11/2005 Hojsgaard ............... C02F 11/18
210/603
8,568,590 B2    10/2013 Barak
(Continued)

FOREIGN PATENT DOCUMENTS

WO    WO 2016/013929 A2    1/2016

OTHER PUBLICATIONS

"Impact of separate urine collection on wastewater treatment systems" Water Science and Technology, 2003, abstract; p. 106, third paragraph, lines 1-5; figure 2.*
(Continued)

*Primary Examiner* — Fred Prince
(74) *Attorney, Agent, or Firm* — Bell & Manning, LLC (57) ABSTRACT

Systems and methods for the treatment of wastewater are provided. By incorporating one or more intermediate phosphate recovery reactors and manipulating the effluent and/or solid streams from those reactors, the systems and methods provide effluent and solid streams having customized phosphate content throughout the wastewater treatment process.

14 Claims, 5 Drawing Sheets

(51) Int. Cl.
  *C02F 11/18*    (2006.01)
  *C01B 25/28*    (2006.01)
  *B01D 61/42*    (2006.01)
  *B01D 61/46*    (2006.01)
  *C01B 25/32*    (2006.01)
  *C02F 9/00*     (2006.01)
  *C02F 11/00*    (2006.01)
  *C02F 11/12*    (2019.01)
  *C02F 1/46*     (2006.01)
  *C02F 1/52*     (2006.01)
  *C02F 1/469*    (2006.01)
  *C02F 101/10*   (2006.01)
  *C02F 101/16*   (2006.01)

(52) U.S. Cl.
  CPC ............... *C01B 25/32* (2013.01); *C02F 9/00* (2013.01); *C02F 11/006* (2013.01); *C02F 11/04* (2013.01); *C02F 11/12* (2013.01); *C02F 11/18* (2013.01); *C02F 1/4693* (2013.01); *C02F 1/5245* (2013.01); *C02F 2101/105* (2013.01); *C02F 2101/16* (2013.01); *C02F 2209/10* (2013.01); *C02F 2209/14* (2013.01); *C02F 2209/18* (2013.01); *C02F 2301/043* (2013.01); *Y02E 50/30* (2013.01)

(58) Field of Classification Search
  CPC ............... C02F 2301/043; C02F 1/5245; C02F 2209/18; C02F 2209/14; C02F 2209/10; C02F 2101/16; C02F 2101/105; C02F 1/4693; C01B 25/32; C01B 25/28; B01D 61/46; B01D 61/422; Y02E 50/343
  USPC ............... 210/603, 609, 631, 906, 907
  See application file for complete search history.

(56) References Cited

U.S. PATENT DOCUMENTS

| | | | |
|---|---|---|---|
| 2003/0217968 A1 | 11/2003 | Goel et al. | |
| 2003/0226803 A1 | 12/2003 | Kamiya et al. | |
| 2005/0023220 A1* | 2/2005 | Barak | B01D 61/24 210/639 |
| 2010/0255562 A1 | 10/2010 | Kang | |
| 2015/0001159 A1* | 1/2015 | Barak | C02F 1/5245 210/702 |
| 2015/0308001 A1* | 10/2015 | Barak | C25B 9/08 204/529 |
| 2015/0360983 A1 | 12/2015 | Murkute et al. | |

OTHER PUBLICATIONS

The International Search Report and Written Opinion issued in International Patent Application No. PCT/US17/55026 dated Dec. 11, 2017, pp. 1-17.

Wilsenach, J. et al., "Impact of separate urine collection on wastewater treatment systems," Water Science and Technology, 2003, abstract; p. 106, third paragraph, lines 1-5, figure 2.

Pallavi Bishnoi, "Effects of Thermal Hydrolysis Pre-Treatment on Anaerobic Digestion of Sludge," Thesis submitted to the faculty of the Virginia Polytechnic Institute and State University, Jul. 31, 2012, pp. 1-73.

The Extended European Search Report issued in EP Patent Application No. 17859067.5 dated Jul. 22, 2020, pp. 1-11.

* cited by examiner

WASTEWATER TREATMENT WITH CUSTOMIZED PHOSPHATE CONTROL

CROSS-REFERENCE TO RELATED APPLICATIONS

This application is a National Stage of International Application No. PCT/US2017/055026, filed Oct. 4, 2017, which claims priority to U.S. provisional patent application No. 62/404,326, filed on Oct. 5, 2016, the entire contents of which are incorporated herein by reference.

BACKGROUND

Phosphorus is both a plant and animal nutrient and an environmental contaminant in the modern world, implicated as a major source of eutrophication of surface waters. Both urban and agricultural waste streams contain phosphorus that entered the element cycle as a nutrient, but one that is difficult to remove and recover in a recyclable form and, therefore, is more nuisance than nutrient. Sewage treatments plants are generally obliged to reduce phosphorus levels in discharge water to low levels. Typically do so by directing the phosphorus to the sewage sludge, or biosolids, which are usually land applied. A number of methods have been devised to recover phosphorus from sewage treatment plants. However, there is an ongoing effort to increase the efficiency of the phosphorus recovery processes used by the wastewater treatment industry.

SUMMARY

Methods for the treatment of wastewater are provided.

One embodiment of a method for treating wastewater includes: (a) dewatering a wastewater comprising solubilized phosphates and organic solids to produce a liquid fraction comprising solubilized phosphates and a high solids content sludge comprising organic solids; (b) feeding the liquid fraction, without the high solids content sludge, into a phosphate recovery reactor, wherein a portion of the solubilized phosphates are precipitated and removed from the liquid fraction to produce a liquid phosphate recovery reactor effluent having a reduced solubilized phosphate content; (c) combining the high solids content sludge with at least a portion of the liquid phosphate recovery reactor effluent to produce a reduced solids content sludge; and (d) feeding the reduced solids content sludge into a sludge reactor located downstream of the phosphate recovery reactor, wherein organic solids in the reduced solids content sludge are broken down.

Another embodiment of a method for treating wastewater includes: (a) dewatering a wastewater comprising solubilized phosphates and organic solids to produce a liquid fraction comprising solubilized phosphates and a high solids content sludge comprising organic matter; (b) feeding the liquid fraction, without the high solids content sludge, into a phosphate recovery reactor, wherein a portion of the solubilized phosphates are precipitated and removed from the liquid fraction to produce a liquid phosphate recovery reactor effluent having a reduced solubilized phosphate content; and (c) feeding the high solids content sludge into a hydrolysis reactor that hydrolyses organic solids in the high solids content sludge to produce a hydrolyzed sludge.

One embodiment of a method for treating wastewater includes: (a) dewatering a wastewater comprising solubilized phosphates and organic solids to produce a liquid fraction comprising solubilized phosphates and a high solids content sludge comprising organic solids;(b) feeding the liquid fraction, without the high solids content sludge, into a phosphate recovery reactor, wherein a portion of the solubilized phosphates are precipitated and removed from the liquid fraction to produce a liquid phosphate recovery reactor effluent having a reduced solubilized phosphate content; (c) adding a phosphate precipitation inducer to the high solids content sludge, wherein solubilized phosphates precipitate in the high solids content sludge to produce a sludge having a reduced solubilized phosphate content; and (d) feeding the sludge having a reduced solubilized phosphate content into a sludge processing chamber located downstream of the phosphate recovery reactor, wherein the sludge undergoes a physical separation, a chemical reaction, or a combination thereof.

Another embodiment of a method for treating wastewater includes: (a) dewatering a wastewater comprising solubilized phosphates and organic solids to produce a liquid fraction comprising solubilized phosphates and a high solids content sludge comprising organic solids; (b) feeding the liquid fraction, without the high solids content sludge, into a phosphate recovery reactor, wherein a portion of the solubilized phosphates are precipitated and removed from the liquid fraction to produce a liquid phosphate recovery reactor effluent having a reduced solubilized phosphate content; (c) adding a phosphate precipitation inducer to the high solids content sludge, wherein solubilized phosphates precipitate in the high solids content sludge to produce a sludge having a reduced solubilized phosphate content; and (e) feeding the sludge having a reduced solubilized phosphate content into a sludge processing chamber located downstream of the phosphate recovery reactor, wherein the sludge undergoes a physical separation, a chemical reaction, or a combination thereof.

Another embodiment of a method for treating wastewater includes: (a) dewatering a wastewater comprising solubilized phosphates and organic solids to produce a liquid fraction comprising solubilized phosphates and a high solids content sludge comprising organic solids;(b) feeding the liquid fraction, without the high solids content sludge, into a phosphate recovery reactor, wherein a portion of the solubilized phosphates are precipitated and removed from the liquid fraction to produce a liquid phosphate recovery reactor effluent having a reduced solubilized phosphate content; (c) adding a phosphate precipitation inducer to the liquid phosphate recovery reactor effluent, wherein solubilized phosphates precipitate out of liquid phosphate recovery reactor effluent to produce a secondary reduced phosphate effluent; and (d) feeding the secondary reduced phosphate effluent into a processing chamber located downstream of the phosphate recovery reactor, wherein the secondary reduced phosphate effluent undergoes a physical separation, a chemical reaction, or a combination thereof.

Another embodiment of a method for treating wastewater includes: (a) dewatering a wastewater comprising solubilized phosphates and organic solids to produce a liquid fraction comprising solubilized phosphates and a high solids content sludge comprising organic solids; (b) feeding the liquid fraction, without the high solids content sludge, into a phosphate recovery reactor, wherein a portion of the solubilized phosphates are precipitated and removed from the liquid fraction to produce a liquid phosphate recovery reactor effluent having a reduced solubilized phosphate content; (c) mixing the high solids content sludge with an effluent, a sludge, or both, from an auxiliary wastewater treatment reactor; and (d) feeding the mixture into a sludge reactor located downstream of the phosphate recovery reactor, wherein organic solids in the mixture are hydrolyzed.

Another embodiment of a method for treating wastewater includes: (a) dewatering a wastewater comprising solubilized phosphates and organic solids to produce a liquid fraction comprising solubilized phosphates and a high solids content sludge comprising organic solids; (b) feeding the liquid fraction, without the high solids content sludge, into a phosphate recovery reactor, wherein a portion of the solubilized phosphates are precipitated and removed from the liquid fraction to produce a liquid phosphate recovery reactor effluent having a reduced solubilized phosphate content; (c) mixing the liquid phosphate recovery reactor effluent with an effluent, a sludge, or both, from an auxiliary wastewater treatment reactor; and (d) feeding the mixture into a sludge reactor located downstream of the phosphate recovery reactor, wherein organic solids in the diluted sludge are hydrolyzed.

Another embodiment of a method for treating wastewater includes: (a) dewatering a wastewater comprising solubilized phosphates and organic solids to produce a liquid fraction comprising solubilized phosphates and a high solids content sludge comprising organic solids; (b) feeding the liquid fraction, without the high solids content sludge, into a phosphate recovery reactor, wherein a portion of the solubilized phosphates are precipitated and removed from the liquid fraction to produce a liquid phosphate recovery reactor effluent having a reduced solubilized phosphate content; and (c) feeding the liquid phosphate recovery reactor effluent into a nitrogen recovery reactor that removes ammonia from the liquid phosphate recovery reactor effluent to produce a nitrogen recovery reactor effluent.

BRIEF DESCRIPTION OF THE DRAWINGS

Illustrative embodiments of the invention will hereafter be described with reference to the accompanying drawings, wherein like numerals denote like elements.

DETAILED DESCRIPTION

Systems and methods for the treatment of wastewater are provided. By incorporating one or more intermediate phosphate recovery reactors and manipulating the effluent and/or solid streams from those reactors, the systems and methods are able to provide effluent and solid streams having customized phosphate content throughout the wastewater treatment process. As a result, the systems and methods provide users with unprecedented versatility in implementing treatment processes that are tailored to their facility's priorities and specifications.

By way of illustration, the present methods can reduce the concentration of solubilized phosphates in a wastewater processing chamber located downstream of a phosphate recovery reactor, thereby rendering the wastewater processing chamber more energy or cost efficient. For example, a downstream sludge dewatering process can be rendered more energy efficient by lowering the concentration of solubilized phosphates in the incoming sludge, or a methane digester can be made more efficient by adding a hydrolysis process and tailoring the solubilized phosphate concentration and/or the solids content of the incoming sludge. The efficiency of the wastewater treatment process at various steps downstream of the phosphate recovery reactor can also be rendered more efficient by the removal of undesirable phosphates, such as magnesium ammonium phosphate (struvite) that can precipitate in unwanted locations. In addition, by enabling the control over the nitrogen to phosphorous ratio in the waste streams exiting the wastewater treatment facility, the present methods allow the user to tailor the sludge and effluents to meet government regulations related to land application of the sludge or the release of the effluent into the environment.

Figure 1:
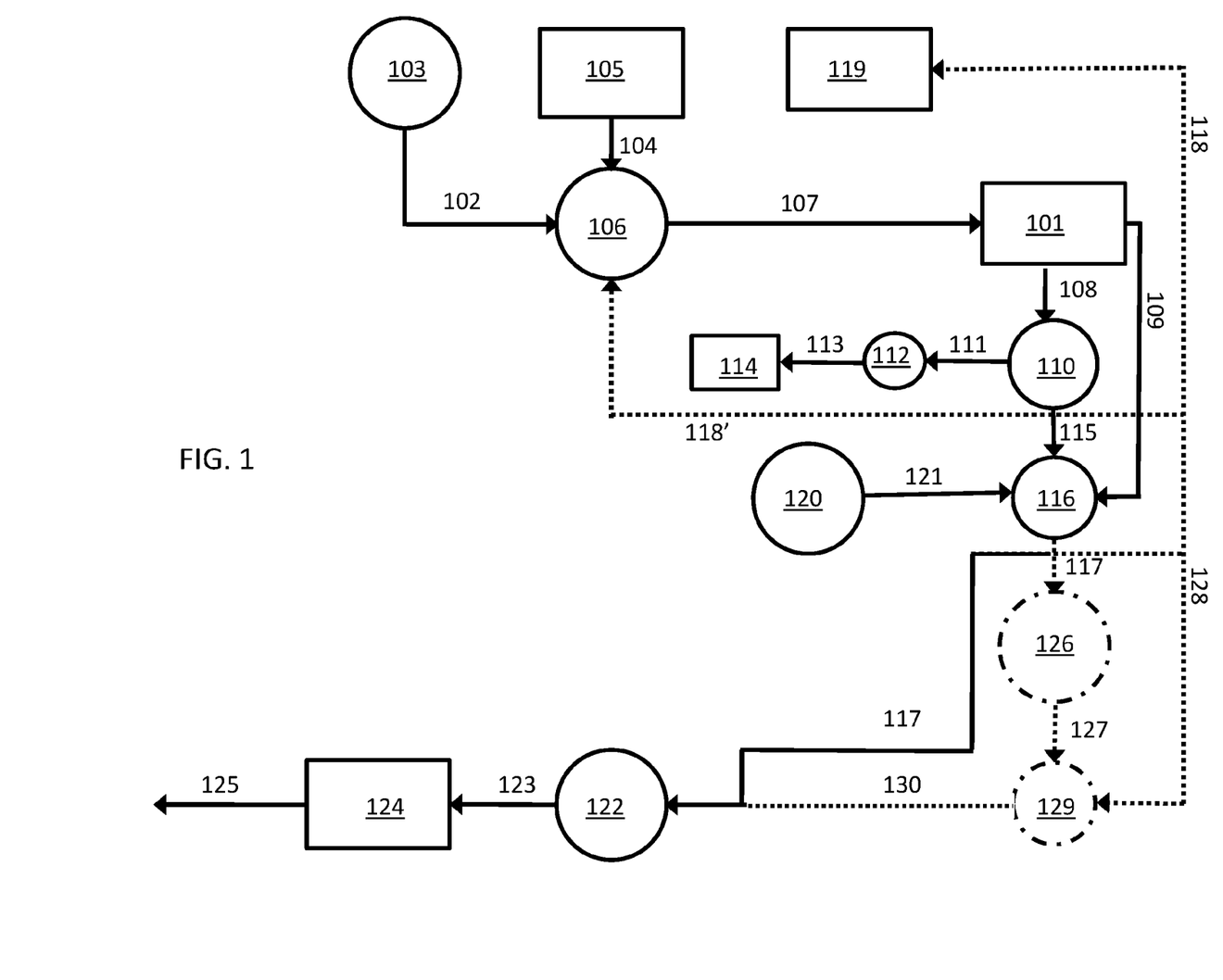
FIG. 1 is a flowchart showing a first embodiment of a wastewater treatment process.

A flowchart illustrating one embodiment of a method for treating wastewater is provided in FIG. 1. The starting wastewater will generally be a sludge containing water, solubilized and precipitated phosphates, and suspended biological organic solids. The sludge may be a primary sludge 102 from a primary clarifier 103, a waste activated sludge (WAS) 104 from a preliminary WAS dewatering chamber 105, or a mixture of the two. The starting sludge may be generated in a municipal sewage treatment facility. However, other types of sludge can also be employed, including sludge generated by food and beverage processing plants, industrial processing waste, manure waste and abattoir waste. Optionally, the starting sludge first may be feed into an organic acid digester 106 in which digestible carbohydrates in the sludge undergo acidogenesis and acetogenesis to produce an organic acid digest 107 containing solubilized and precipitated phosphates and a relatively high concentration of volatile and non-volatile fatty acids. Depending on the nature of the starting sludge, the solubilized and precipitated phosphates can include magnesium phosphates, calcium magnesium phosphates, and/or calcium phosphates. The fatty acids will generally include acetic acid and proprionic acid, but can also include other fatty acids, such as n-butyric acid, n-valeric acid, iso-butyric acid, iso-valeric acid, sec-valeric acid, and combinations thereof. Other components of the starting sludge, the organic acid digest, or both, may include solubilized and precipitated nitrogen compounds, such as nitrates, nitrites and ammonium, as well as sulfates, heavy metals, and/or metal salts.

The methods may begin with a dewatering step that can be carried out in a dedicated dewatering chamber 101. This step separates a liquid fraction (a liquor) 108 from a solids fraction (a cake) 109. Dewatering can be carried out, for example, by centrifugation, filtration, or a combination thereof. It should be understood that the separation of the solid components from the liquid components generally will not result in the complete separation of all liquids from the solid fraction or all suspended solids from the liquid fraction, so that the liquid fraction may retain a small concentration of suspended solids and the solids fraction will take the form of a high solids content sludge. The exact solids content of the high solids content sludge will depend on a variety of factors, including the solids content of the material being fed into the dewatering chamber and the conditions (e.g., equipment and duration) of the dewatering process. However, the high solids content sludge will be characterized in that its solids content is substantially lower than the solids content of the material that is fed into the dewatering chamber. By way of illustration only, some embodiment of the high solids content sludge exiting the dewatering chamber will have a solids content in the range from 8% to 30%, by weight. This includes embodiments of the high solids content sludge having a solids content in the range from 12% to 25%, by weight. The liquid fraction 108 produced by the dewatering process is then passed into a phosphate recovery reactor 110.

For the purpose of this disclosure, a phosphate recovery reactor is a reactor that serves the primary purpose of precipitating phosphates from the liquid fraction influent and separating the precipitated phosphates from the resulting liquid effluent. Thus, the solubilized phosphate content of the liquid phosphate recovery reactor effluent is substantially lower than that of the liquid fraction that is initially fed into the phosphate recovery reactor. An example of a phosphate recover reactor that can be used in the present systems and methods is described in U.S. Pat. No. 8,568,590, the entire contents of which are incorporated herein by reference.

When liquid fraction 108 is derived from an organic acid digest, it will have high levels of solubilized phosphates, since phosphates that are typically present in the starting sludge are very soluble in the mildly acidic environment of the organic acid digester. In phosphate recovery reactor 110, the precipitation of phosphates is induced by increasing the pH of the liquid fraction to a near neutral pH value. By way of illustration only, a liquid fraction having a starting pH value of 5.5 or lower can have its pH increased to a value in the range from about 6 to 8, including from about 6 to 7, by adding calcium and/or magnesium to the phosphate recovery reactor. This may be accomplished, for example, by adding base, either in the form of calcium carbonate and its calcined products, calcium oxide (lime), and/or calcium hydroxide; dolominte (calcium magnesium carbonate) and its calcined products; magnesite and its calcined products; or calcium-saturated weak-acid ion exchange resins. In some embodiments of the methods, the phosphate precipitation conditions in phosphate recovery reactor 110 are tailored such that at least 50% by weight of the precipitated phosphates comprise brushite ($CaHPO_4 \cdot 2H_2O$), as opposed to struvite (magnesium ammonium phosphate) or any other mineral phosphate. This includes embodiments of the phosphate recovery reactor that product a phosphate precipitate containing at least 55%, or at least 60%, brushite, by weight. The precipitated phosphate 111 can then be removed from phosphate recovery reactor 110, and sent into a dryer 112, and the resulting dried phosphate precipitates 113 can then be packaged 114 for use as a fertilizer.

At least a portion of the liquid effluent 115 from phosphate recovery reactor 110 (i.e., the "liquid phosphate recovery reactor effluent") can then used as a sludge diluent for a variety of downstream sludge treatment processes. For example, liquid phosphate recovery reactor effluent 115 can be fed into a mixing tank 116 and mixed with high solids content sludge 109 from dewatering chamber 101 to produce a diluted sludge 117 having a reduced solids concentration relative to that of high solids content sludge 109. The exact solids content of this reduced solids content sludge will depend on a variety of factors, including the solids content of the high solids content sludge that is fed into the mixing tank and the extent of dilution with the liquid effluent from the phosphate recovery reactor. However, the reduced solids content sludge will be characterized in that its solids concentration is lower than the solids concentration of the high solids content sludge from which it is derived. By way of illustration only, some embodiment of the reduced solids content sludge exiting the mixing tank will have a solids content in the range from 1% to 29%, by weight. This includes embodiments of the reduced solids content sludge having a solids content in the range from about 5% to about 20%, by weight. Alternatively, the high solids content sludge can be dried to reduce its water content and increase its solids concentration prior to further processing. Optionally, any unused portions of the liquid phosphate recovery reactor effluent can be recycled back to other parts of the wastewater treatment process for further processing. For example, as shown in FIG. 1, a first unused portion 118 of the liquid effluent from phosphate recovery reactor 110 can be recycled back to the wastewater treatment plant headworks 119 and a second unused portion 118' of the liquid effluent from phosphate recovery reactor 110 can be recycled back into organic acid digester 106.

In some embodiments of the present methods, reduced solids sludge 117 undergoes an additional phosphate removal step in mixing tank 116. This additional phosphate removal step is a separate and different treatment step from the phosphate removal that occurs in phosphate recovery reactor 110 and is used to still further reduce the concentration of solubilized phosphates. In this step a phosphate precipitation inducer 121 from an inducer source 120 is introduced into mixing tank 116 where it causes solubilized phosphates to precipitate out of the sludge. The phosphate precipitation inducer may be, for example, a base that increases the pH of the solution in the mixing tank or a chemical that reacts with solubilized phosphates to form phosphate precipitates, such as an aluminum or iron salt or calcium hydroxide. The phosphates that are precipitated from the reduced solids content sludge can be separated and recovered from the sludge, or retained by and sequestered in the sludge.

Figure 3:
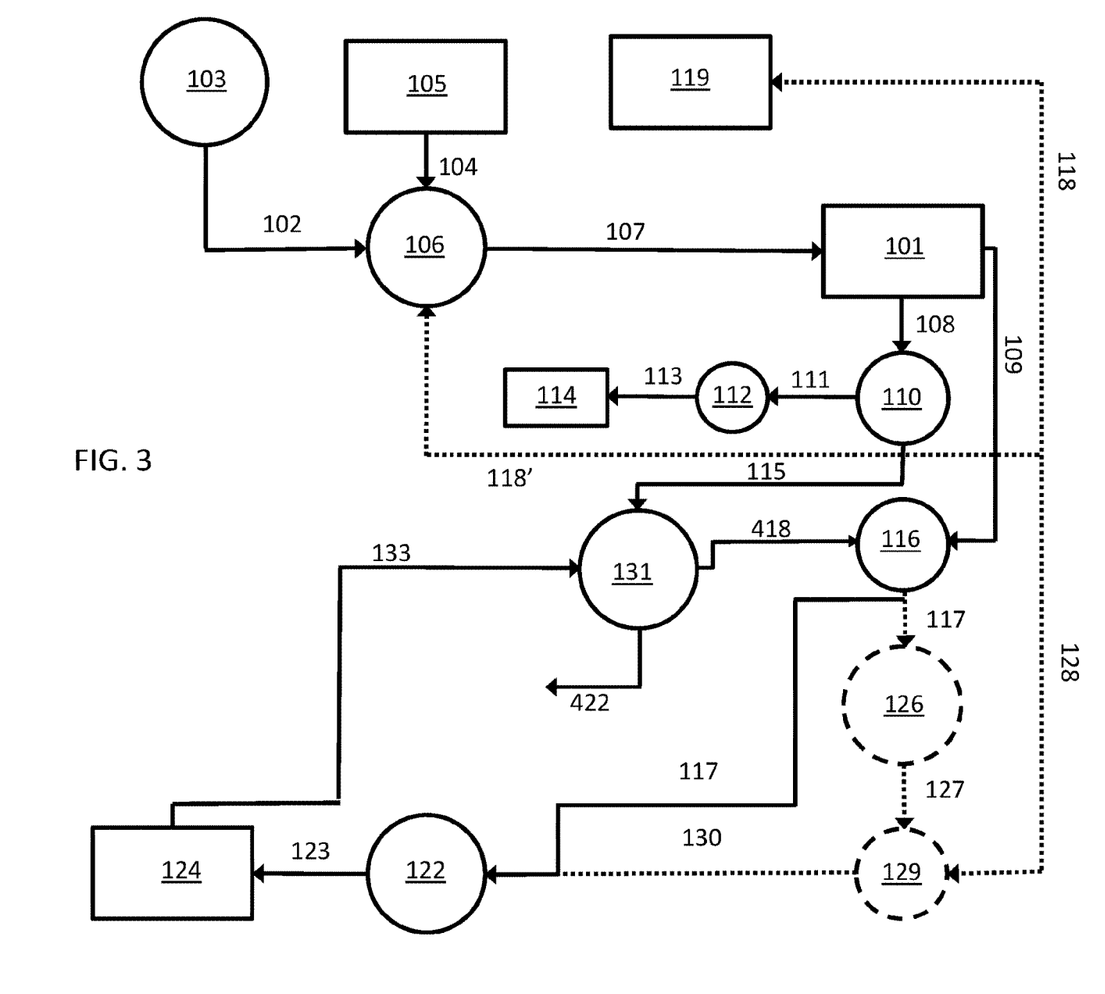
FIG. 3 is a flowchart showing a third embodiment of a wastewater treatment process.

Although not shown in FIG. 1, the additional phosphate removal step can also be carried out independently on high solids content sludge 109, liquid phosphate recovery reactor effluent 115, or both, prior to mixing them in mixing tank 116. (In fact, the high solids content sludge and/or the liquid phosphate recovery reactor effluent need not be combined at all after the additional phosphate removal step is carried out. For example, mixing tank 116 could be omitted from the system shown in FIG. 1 and high solids content sludge 109 could be fed directly into a downstream sludge processing chamber, such as a hydrolysis reactor or an anaerobic digester. Or, the liquid phosphate recovery reactor effluent could be fed directly into a nitrogen recovery reactor, as illustrated in FIG. 3, which is discussed in greater detail below.)

Once the solids concentration and, optionally, the phosphate content of reduced solids content sludge 117 has been tailored to the desired specifications, it can be fed into a number of downstream sludge reactors in which organic solids in the reduced solids content sludge are broken down through thermal treatments, chemical treatments, or a combination thereof. As illustrated in FIG. 1, the downstream sludge reactor can be an anaerobic methane digester 122 in which fatty acids, alcohols, and other organic compounds in the reduced solids content sludge are converted into biogas by methanogenic bacteria. Typically, the biogas will be comprised of primarily methane and carbon dioxide. However, other biogases can be produced. The biogas from methane digester 122 can be captured, while the methane digest 123 from methane digester 122, can be fed into a digest dewatering equipment 124 where it is separated into liquid and solid waste streams. One or both of these streams 125 can be released from the wastewater treatment facility for land application or can be recycled back to other parts of the wastewater treatment process for further processing. For example, effluent from 124 can be recycled back to the wastewater treatment plant headworks 119. Optionally, the solid waste stream can be dried to reduce its water content and increase its solids concentration prior to further processing.

Figure 2:
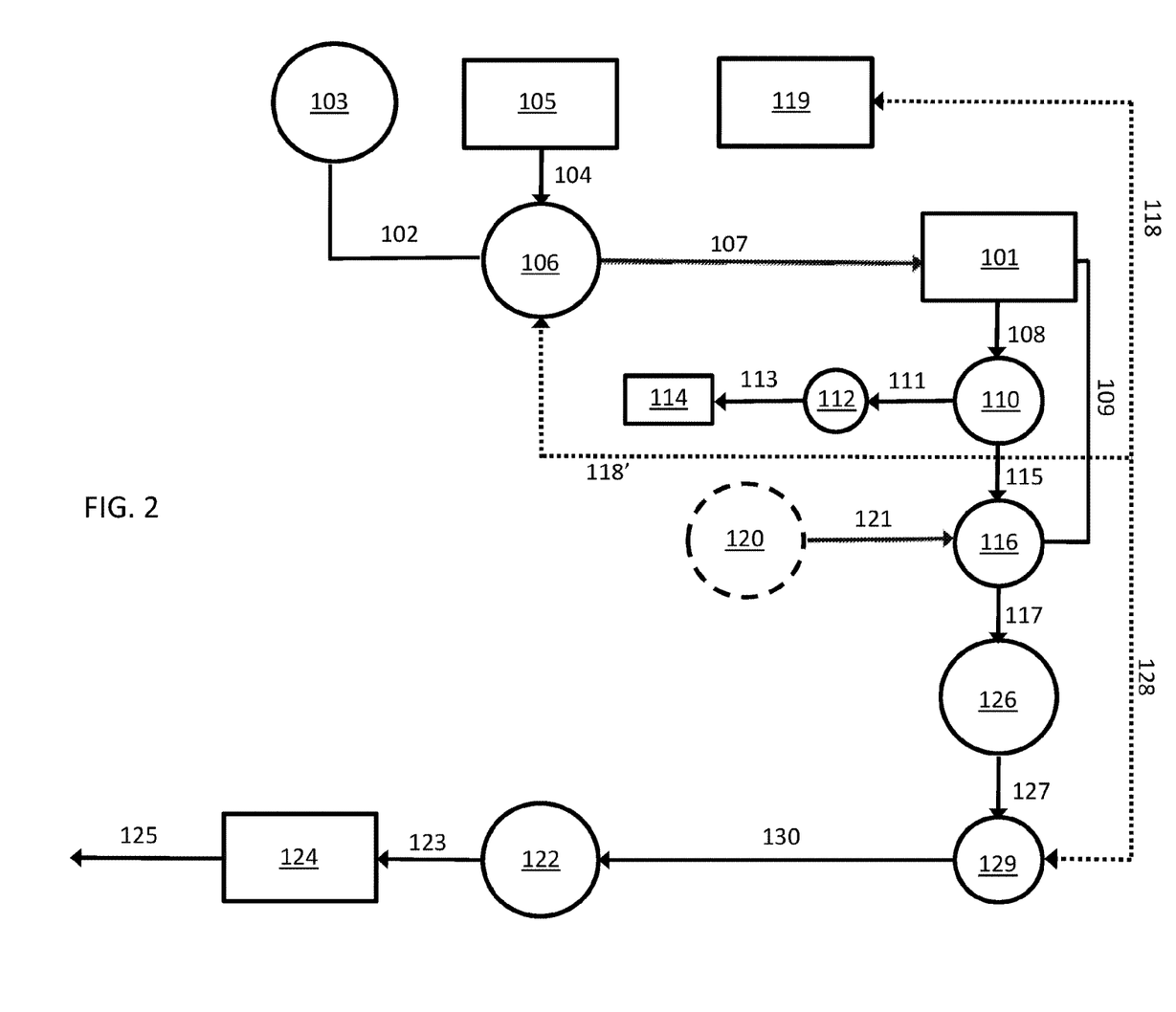
FIG. 2 is a flowchart showing a second embodiment of a wastewater treatment process.

Alternatively, as illustrated in FIG. 2, the reduced solids content sludge 117 can be fed into a hydrolysis reactor system 126 where carbohydrates, proteins, and other organic compounds are hydrolyzed prior to subjecting the reduced solids content sludge to methanogenesis. The primary purpose of this hydrolysis pre-treatment is to break down the organic matter in the reduced solids sludge so that the subsequent methanogenesis of the sludge and biogas production is rendered more energy efficient. The hydrolysis can be induced using a thermal, pressure, chemical, biological, shear stress or other hydrolysis process. Two or more hydrolysis reactors can be used in series and/or multiple hydrolyses processes can be carried out sequentially or simultaneously in a single hydrolysis reactor. A thermal hydrolysis reactor is one in which hydrolysis is induced by heating the reduced solids content sludge, typically to temperatures in the range from about 150° C. to about 200° C.—although temperatures outside this range can be used; a thermal pressure hydrolysis reactor is one in which hydrolysis is induced by heating the reduced solids content sludge, typically to temperatures in the range from about 150° C. to about 200° C. and between 90-130 psi—although temperatures and/or pressures outside this range can be used; a chemical hydrolysis reactor is one in which a hydrolysis is induced by adding an acid or a base to the reduced solids content sludge; a thermochemical hydrolysis reactor is one in which hydrolysis is induced by combining heat with an acid or a base; or a biological hydrolysis reactor is one in which enzyme catalyzed hydrolysis is carried out, but terminated prior to methane production. The hydrolysis reactor produces a hydrolyzed sludge 127 that is generally characterized by an enhanced volatile fatty acids content. Optionally, hydrolyzed sludge 127 can be mixed with a portion 128 of the liquid phosphate recovery reactor effluent in a mixing tank 129 or other step after hydrolysis to provide a low solids content sludge 130. The exact solids content of the low solids sludge will depend on a variety of factors, including the solids content of the reduced solids content sludge that is fed into the hydrolysis reactor and the extend of dilution with the liquid effluent from the phosphate recovery reactor. However, the low solids content sludge will be characterized in that its solids concentration is lower than the solids concentration of the reduced solids content sludge that entered the hydrolysis reactor. By way of illustration only, some embodiment of the low solids content sludge exiting the hydrolysis reactor will have a solids content in the range from 8% to 30%, by weight. Alternatively, the hydrolysed sludge can be dried to reduce its water content and increase its solids concentration prior to further processing. The hydrolyzed sludge, with or without dilution, then can be fed into anaerobic methane digester 122.

Although not shown in FIG. 2, the high solids content sludge or the reduced solids content sludge can be treated to remove ammonia in an ammonia recovery reactor prior to entering the hydrolysis reactor.

As shown by the dotted arrows and dashed lines in FIG. 1, the methods of FIG. 1 and FIG. 2 can be combined by dividing reduced solids content sludge 117 after it exits mixing tank 116, with a first portion of the reduced solids sludge being fed directly into methane digester 122, while a second portion is fed directly into hydrolysis reactor 126 for pre-treatment as illustrated in FIG. 2. In any of the embodiments shown in FIGS. 1 and 2, high solids content sludge 109 can be mixed with the effluent from an auxiliary wastewater treatment reactor, rather than with (or in addition to) the effluent from phosphate recovery reactor, to produce reduced solids content sludge 117. Similarly, low solids content sludge 127 can be mixed with the effluent from an auxiliary wastewater treatment reactor, rather than with (or in addition to) the effluent from phosphate recovery reactor, to produce diluted low solids sludge 130. As used herein, the term "auxiliary wastewater treatment reactor" refers to a reactor that has an original wastewater source that is not the same as the wastewater that is initially dewatered in dewatering tank 101 of the present process. As such, neither the liquid fraction nor the solid fraction from dewatering chamber 101 ever flows into the auxiliary reactor. By way of illustration, in a method for treating wastewater in a municipal sewage treatment plant where the starting wastewater is municipal sewage, an auxiliary wastewater treatment reactor could be a tank used to process brewery waste which is then combined with primary sludge, waste activated sludge, other incoming sludges, or some combination thereof. By combining the acid digest, brewery waste or other sludge with high solids content sludge 109 in mixing tank 116, the efficiency of downstream methane digester 122 can be optimized.

FIG. 3 shows a flowchart of an alternative embodiment of a wastewater treatment process in which the liquid effluent 115 from phosphate recovery reactor 110 is diverted into a nitrogen recovery reactor 131. The primary purpose of nitrogen recovery reactor 131 is to remove nitrogen from liquid effluent 115. For example, nitrogen recovery reactor 131 can include an electrodialysis stack that converts nitrogen contained in liquid effluent 115 into ammonia gas and monovalent salts. An example of a nitrogen recovery reactor is described in U.S. patent application publication number 2015/0308001, the entire contents of which are incorporated herein by reference. As adapted for the present systems and methods, it is the liquid phosphate recovery reactor effluent that would be fed into the nitrogen recovery reactor of U.S. patent application publication number 2015/0308001, rather than a separated anaerobic digestate influent.

Figure 4:
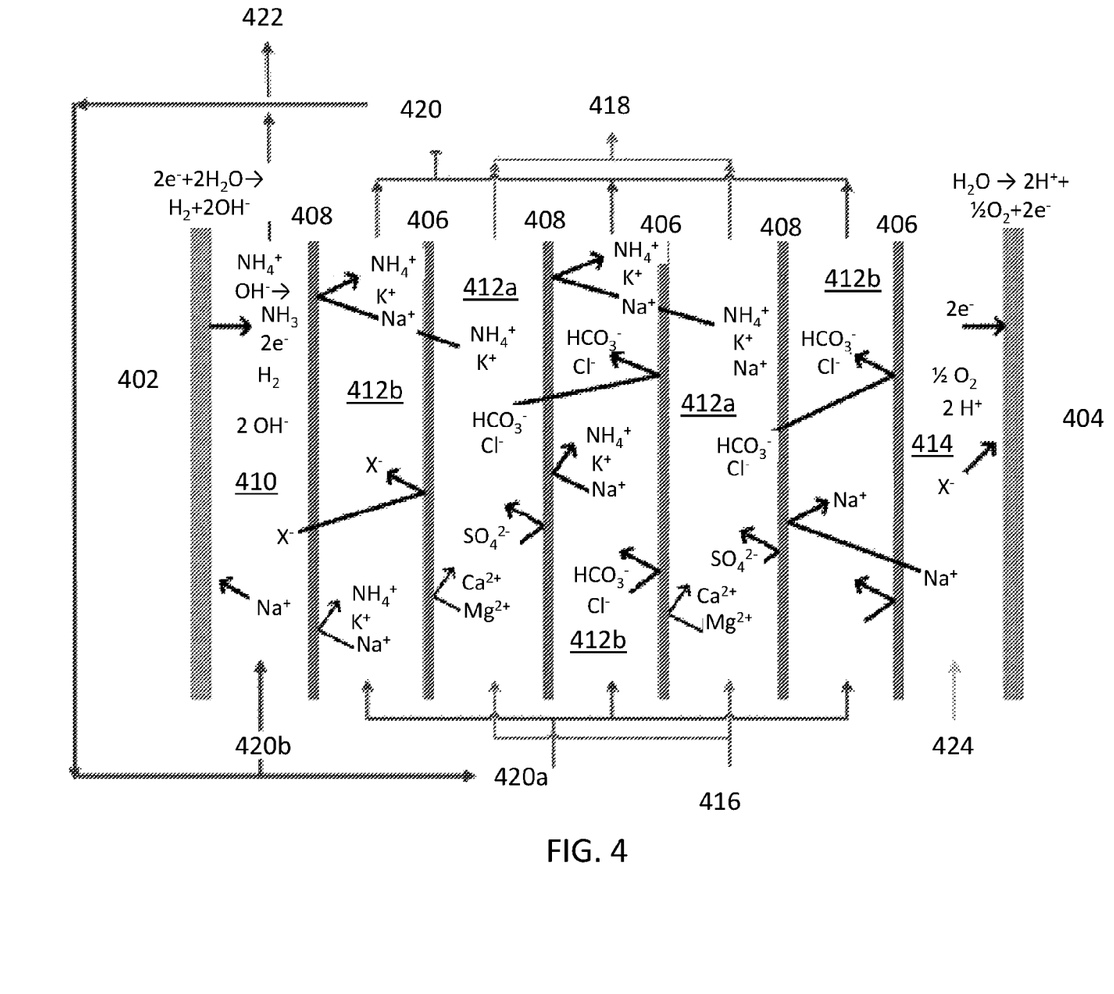
FIG. 4 is a schematic diagram of an electrodialysis stack comprising a series of monovalent-selective cation exchange membranes and monovalent-selective anion exchange membranes that can be used as a nitrogen recovery reactor.

FIG. 4 is a schematic diagram illustrating the operation an electrodiaylsis cell stack in a nitrogen recovery reactor. The electrodialysis cell stack includes monovalent-selective cation exchange membranes and anion exchange membranes. As illustrated in the figure, the electrodialysis stack comprises a cathode 402, an anode 404, one or more monovalent-selective cation exchange membranes 406, and one or more anion exchange membranes 408. For purposes of illustration anionic membranes 408 in this embodiment are monovalent-selective anion exchange membranes. However, non-selective anion exchange membranes can also be used. Monovalent-selective cation exchange membranes 406 and monovalent-selective anion exchange membranes 408 are disposed in an alternating relationship between cathode 402 and anode 404. The anode, cathode and ion exchange membranes are contained within a housing with spacers (not shown). Within the stack, a cathode cell compartment 410 is defined between cathode 402 and its adjacent anion exchange membrane 408 and an anode cell compartment 414 is defined between anode 404 and it adjacent cation exchange membrane 406. A plurality of electrodialysis cell compartments 412a and 412b are defined between adjacent cation and anion exchange membranes in the stack.

During electrodialysis, an electrical potential is applied across the anode and cathode, which are immersed in an ionic influent. This causes the charged cations and anions to move toward the cathode and anode, respectively. The movement of the ions is further controlled by the monovalent-selective cation exchange membranes and monovalent-selective anion exchange membranes, each only (or substantially only) allowing monovalent cations or monovalent anions, respectively, to pass through. Electrodialysis generally uses a low voltage (e.g., a voltage of 25 VDC or less) to drive the current against the electrical resistance provided by the influent and product solutions. The power required to run the electrodialysis can be provided by conventional sources or from photovoltaic cells, methane-powered generators, or other sources.

Figure 5:
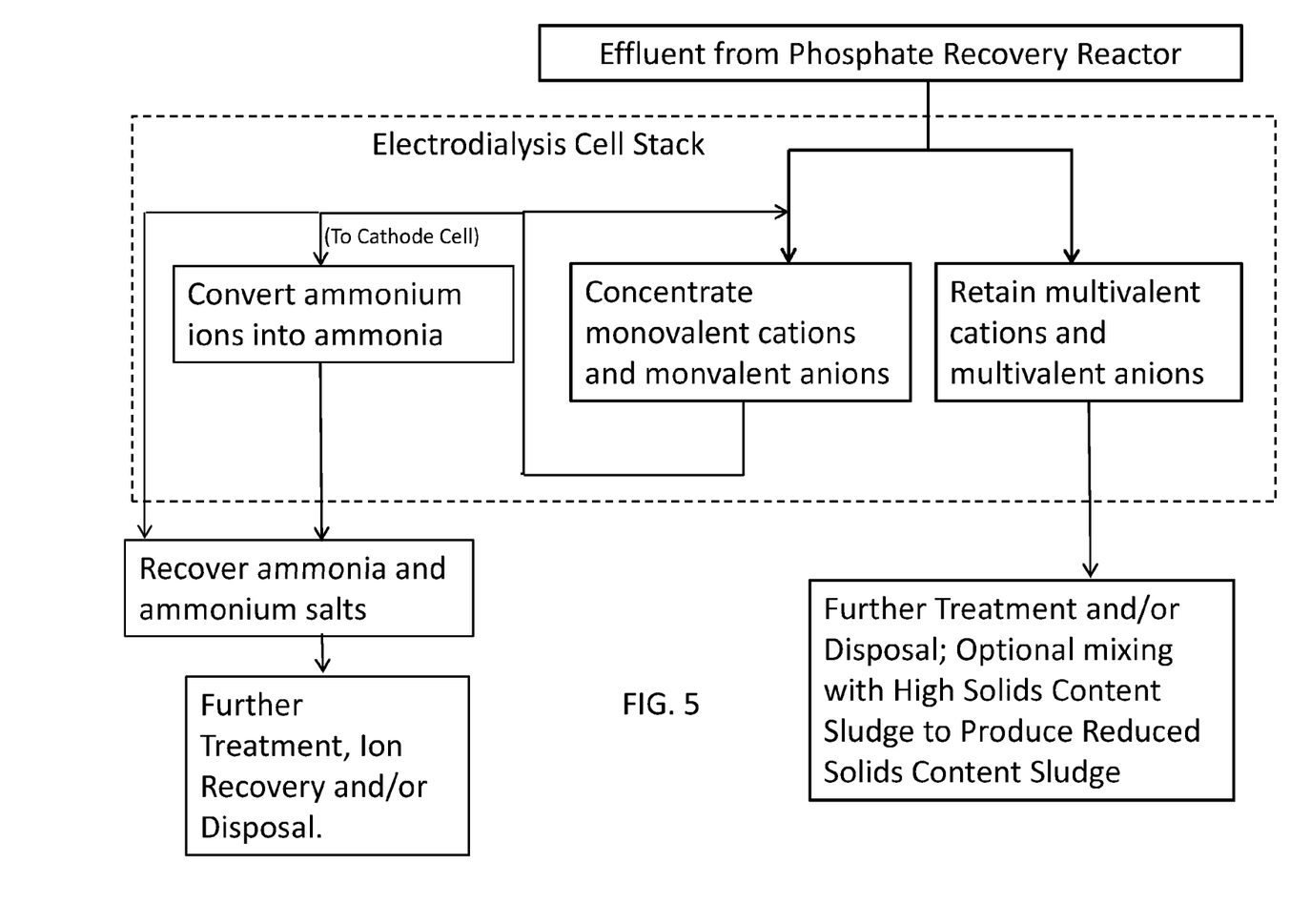
FIG. 5 is a process flow diagram illustrating the processing flow used in the electrodialysis stack of FIG. 4.

The process flow for a method of recovering nitrogen, in the form of ammonia and monovalent salts, from the liquid effluent from a phosphate recovery reactor using an electrodialysis stack is represented by the arrows in FIG. 4 and the process flow diagram of FIG. 5. The liquid effluent from a phosphate recovery reactor 416 is fed into a first subset of electrodialysis cell compartments 412a where ions undergo cation exchange and anion exchange with membranes 406 and 408. As a result, multivalent cations and multivalent anions are selectively retained in the product streams in the first set of electrodialysis cell compartments (diluate cell compartments) 412a, while monovalent cations, including ammonium ions, and monovalent anions pass through the membranes to become concentrated in the product streams of a second set of electrodialysis cell compartments (concentrate cell compartments) 412b. The diluate stream, which is referred to herein as the nitrogen recovery reactor effluent, 418 from diluate cell compartments 412a is passed out of the stack for further processing and/or disposal. Channels, such as pipes or tubing, are provided to separate concentrate effluent 420 from concentrate cell compartments 412b into a first portion 420a and a second portion 420b. Portion 420a is fed back into concentrate cell compartments 412b, where it undergoes further electrodialysis to further enhance its concentration of monovalent cations and monovalent anions. Optionally, second portion 420b of effluent 420 is fed into cathode cell compartment 410, where ammonium ions are converted into ammonia, either partially or wholly, through reactions with hydroxide ions produced at cathode 402. The effluent 422 from cathode cell compartment 410 (cathode effluent) is then passed out of the stack and the ammonia recovered. Monovalent salts may be recovered from 420a after sufficient recirculation in the concentrate cell compartments.

Concentrate effluent from the concentrate cell compartments can be cycled back through the concentrate cell compartments multiple times until a desired monovalent ion concentration has been achieved, at which point the concentrate effluent can be passed out of the stack for ammonia and ammonium recovery, further processing and/or disposal. Embodiments of the methods that utilize single-cycle diluate effluent production in combination with multi-cycle concentrate effluent production allow for the continuous production of a product stream with a very high ion concentration from which ions can be continuously removed.

Some embodiments of the methods include the additional step of passing a portion of the concentrate stream 420b through the cathode cell compartment 410 (the cathode stream) in order to raise or maintain the pH in the product stream. The pH of the product stream is desirably between 9 and 10 because alkaline conditions facilitate the conversion of ammonium to ammonia. However, an advantage of the present methods is that by utilizing the hydroxide produced at the cathode via electrolysis of water to convert ammonium ions into ammonia, the amount of chemical base that would otherwise be required is reduced. Optionally, additional chemical base may be added to the product stream 422 to complete the conversion of ammonium to ammonia.

In the embodiment of the process shown in FIG. 4, the liquid phosphate recovery reactor effluent 416 comprises ammonium ions, potassium ions, sodium ions, calcium ions, magnesium ions, bicarbonate ions, chloride ions, monohydrogen and dihydrogen phosphate ions and sulfate ions. As a result, the phosphate recovery reactor effluent has approximately unchanged concentrations of calcium ions, magnesium ions and sulfate ions; concentrate effluent 420 is concentrated in ammonium ions, potassium ions, bicarbonate ions and chloride ions; and cathode effluent 422 contains ammonia and is concentrated in ammonium ions, potassium ions, bicarbonate ions and chloride ions. However, the ion content of the liquid phosphate recovery reactor effluent, which is used as the influent for the nitrogen recovery reactor, will depend on the source and nature of the starting sludge being treated. In particular, phosphate ions in the form of monohydrogen phosphate (divalent) and dihydrogen phosphate (monovalent) also may be present, in a ratio that reflects the pH of the wastewater.

In embodiments of the electrodialysis stacks that use non-selective anion exchange membranes (that is, anion exchange membranes that do not selectively discriminate against multivalent anions,) multivalent anions in the influent will pass through the anion exchange membranes and become concentrated in the concentrate streams along with the monovalent anions. Such an embodiment permits concentration of phosphate ions, both monohydrogen phosphate and dihydrogen phosphate, in the concentration stream if desired.

The ammonia and monovalent salts in the alkaline cathode effluent can be separated from other components of the effluent using a variety of ammonia separators and separation techniques. For example, the cathode effluent can be passed through an ammonia stripping column where it undergoes vacuum or sparging with air or steam to transfer the ammonia from the liquid phase to the gas phase. The vaporized ammonia can then be recovered by condensation upon refrigeration or by neutralization in an acid trap containing a strong acid, such as sulfuric acid, nitric acid or phosphoric acid, to produce ammonium sulfate, ammonium nitrate or ammonium phosphate. A description of ammonia stripping can be found in Mondor, M., Masse, L., Ippersiel, D., Lamarche, F. and Masse, D. I., 2008, Use of electrodialysis and reverse osmosis for the recovery and concentration of ammonia from swine manure, Bioresource Technology 99, pg: 7363-7368; and in U.S. Pat. No. 2,519,451.

Ammonium bicarbonate and ammonium carbonate from the cathode and concentrate effluents can also be recovered via thermolytic distillation (e.g., at 50-80° C.) of the effluents using a vacuum distillation column to separate ammonia and carbon dioxide, followed by condensation of the ammonia. This process is described in greater detail in McGinnis, R. L., Hancock, N. T., Nowosielski-Slepowron, and M. S., McGurgan, G. D. 2013, Pilot demonstration of the $NH_3/CO_2$ forward osmosis desalination process on high salinity brines, Desalination 312:67-74.

After the removal of ammonia and ammonium salts from the concentrate effluent, other ions, such as potassium ions and phosphate ions, can be removed from the concentrate effluent and/or cathode effluent. For example, phosphate ions will cross through the anion exchange membranes in response to the electrical field if non-selective anion exchange membranes are employed. Phosphate then can be recovered from the concentrate stream by a number of known technologies. The electrodialysis stacks described here can be deployed singly or arranged with multiple stacks in parallel. Once the ammonia and ammonium salts have been removed, the concentrate effluent can be recycled back to other parts of the wastewater treatment process for further processing.

Although the electrodialysis stacks discussed above all include monovalent-selective cation exchange membranes, the electrodialysis stacks can also comprise non-valent-selective cation exchange membranes in combination with monovalent-selective anion exchange membranes. Such a stack could have the same basic layout as the electrodialysis stack shown in FIG. 4, except that membranes 406 would be non-valent-selective cation exchange membranes and membranes 408 would be monovalent-selective anion exchange membrane. The monovalent anion membranes would let only (or substantially only) monovalent anions pass into the concentrate streams. Then acidification of the concentrate streams (for example, by routing through the anode cell compartment) could be carried out in order to eliminate bicarbonate from the system and thus produce concentrate streams free of carbonates, but loaded with salts of various cations with monovalent anions, such as chloride, monovalent phosphate, nitrate and other monovalent ions. These ions can later be manipulated in a controlled fashion to separate their various salts by precipitation, distillation or other means.

Optionally, at least a portion of the effluent from nitrogen recovery reactor 131 (the "nitrogen recovery reactor effluent" 418) can be fed into mixing tank 116 and mixed with high solids content sludge 109 from dewatering chamber 101 to produce reduced solids content sludge 117 and/or recycled back to other parts of the wastewater treatment process, including the headworks, for further processing. As shown in FIG. 3, this diluted sludge can be further processed just like the reduced solids content sludge 117 in FIGS. 1 and 2 that was diluted with the effluent from the phosphate recovery reactor. As a further option, the liquid stream 133 from digest dewatering tank 124 can be fed into nitrogen recovery reactor 131 as an additional influent, as shown in FIG. 3.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for treating wastewater comprising:
dewatering a wastewater comprising solubilized phosphates and organic solids to produce a liquid fraction comprising solubilized phosphates and a high solids content sludge comprising organic solids;
feeding the liquid fraction, without the high solids content sludge, into a phosphate recovery reactor, wherein a portion of the solubilized phosphates are precipitated and removed from the liquid fraction to produce a liquid phosphate recovery reactor effluent having a reduced solubilized phosphate content;
combining the high solids content sludge with at least a portion of the liquid phosphate recovery reactor effluent to produce a reduced solids content sludge; and
feeding the reduced solids content sludge into a hydrolysis reactor located downstream of the phosphate recovery reactor, wherein organic solids in the reduced solids content sludge are hydrolyzed to produce a hydrolyzed sludge.

2. The method of claim 1, wherein the wastewater comprising solubilized phosphates and organic solids is an organic acid digest that is formed by digesting a starting sludge comprising soluble phosphates in an organic acid digester where digestible carbohydrates in the sludge undergo acidogenesis and acetogenesis to produce the organic acid digest, wherein the starting sludge is a primary sludge, a waste activated sludge, or a combination thereof.

3. The method of claim 1, wherein the portion of the solubilized phosphates that are precipitated and removed from the liquid fraction comprise at least 50 percent brushite by weight.

4. The method of claim 1, further comprising adding a phosphate precipitation inducer to the reduced solids content sludge, wherein solubilized phosphates precipitate in the diluted sludge.

5. The method of claim 1, further comprising mixing the hydrolyzed sludge from the hydrolysis reactor with a portion of the liquid phosphate recovery effluent and feeding the mixture into an anaerobic methane digester, wherein organic compounds in the mixture are converted into methane.

6. The method of claim 1, further comprising adding a phosphate precipitation inducer to the high solids content sludge, wherein solubilized phosphates precipitate in the high solids content sludge, prior to combining the high solids content sludge with a portion of the liquid phosphate recovery reactor effluent.

7. The method of claim 1, further comprising adding a phosphate precipitation inducer to the liquid phosphate recovery reactor effluent, wherein solubilized phosphates precipitate out of the liquid phosphate recovery reactor effluent, prior to combining the high solids content sludge with a portion of the liquid phosphate recovery reactor effluent.

8. The method of claim 7, wherein the solubilized phosphates that precipitate upon the addition of the phosphate precipitation inducer comprise at least 50 percent brushite by weight.

9. A method for treating wastewater comprising:
dewatering a wastewater comprising solubilized phosphates and organic solids to produce a liquid fraction comprising solubilized phosphates and a high solids content sludge comprising organic matter;
feeding the liquid fraction, without the high solids content sludge, into a phosphate recovery reactor, wherein a portion of the solubilized phosphates are precipitated and removed from the liquid fraction to produce a liquid phosphate recovery reactor effluent having a reduced solubilized phosphate content; and feeding the high solids content sludge into a hydrolysis reactor that hydrolyses organic solids in the high solids content sludge to produce a hydrolyzed sludge.

10. The method of claim 9, wherein the wastewater comprising solubilized phosphates and organic solids is an organic acid digest that is formed by digesting a starting sludge comprising soluble phosphates in an organic acid digester where digestible carbohydrates in the sludge undergo acidogenesis and acetogenesis to produce the organic acid digest, wherein the starting sludge is a primary sludge, a waste activated sludge, or a combination thereof.

11. The method of claim 9, wherein the portion of the solubilized phosphates that are precipitated and removed from the liquid fraction comprise at least 50 percent brushite by weight.

12. The method of claim 9, further comprising: mixing a portion of the liquid phosphate recovery reactor effluent with the hydrolyzed sludge to produce a low solids content sludge; and feeding the low solids content sludge into an anaerobic digester.

13. The method of claim 9, further comprising combining the high solids content sludge with an effluent from an auxiliary wastewater treatment reactor, prior to feeding the high solids content sludge into the hydrolysis reactor.

14. The method of claim 13, wherein the auxiliary wastewater treatment reactor is a nitrogen recovery reactor.

* * * * *